United States Patent [19]

Dupouy

[11] 3,830,974

[45] Aug. 20, 1974

[54] VIDEO SIGNAL GENERATOR

[76] Inventor: Marcel Dupouy, 7, rue de l'Yser-92, Saint Cloud, France

[22] Filed: Aug. 1, 1972

[21] Appl. No.: 276,911

[30] Foreign Application Priority Data

Aug. 2, 1971 France ............................. 71.28193

[52] U.S. Cl. ............................................. 178/7.3 D

[51] Int. Cl. ............................................. H04n 5/66

[58] Field of Search ............ 178/7.3 D, DIG. 6, 6.8; 340/324 AD; 315/18

[56] References Cited

UNITED STATES PATENTS

| | | | |
|---|---|---|---|
| 2,193,869 | 3/1940 | Goldsmith | 178/DIG. 6 |
| 2,240,420 | 4/1941 | Schnitzer | 178/DIG. 6 |
| 3,612,761 | 10/1971 | Wolff | 178/DIG. 6 |
| 3,706,851 | 12/1972 | Froehlich et al. | 178/DIG. 6 |
| 3,718,757 | 2/1973 | Gulitz et al. | 178/DIG. 6 |
| 3,728,480 | 4/1973 | Baer | 178/6.8 |

*Primary Examiner*—Robert L. Richardson

*Assistant Examiner*—Mitchell Saffian

[57] ABSTRACT

Signals rephased with each cycle of the line and frame synchronization signals of a standard television system are employed to generate complex voltages. These complex voltages are utilized to produce fixed and animated displays on the screen of a television receiver.

13 Claims, 8 Drawing Figures

VIDEO SIGNAL GENERATOR

BACKGROUND OF THE INVENTION:

1. Field of the Invention

The present invention relates to the production of fixed and animated displays. More specifically, this invention is directed to apparatus for generating displays for viewing on a standard television receiver. Accordingly, the general objects of the present invention are to provide novel and improved methods and apparatus of such character.

2. Description of the Prior Art

While not limited thereto in its utility, the present invention is particularly well suited for the generation of complex periodic electrical signals which may be employed, after suitable adaptation, to create fixed or animated displays on the screen of a standard television receiver. Electronic circuits are known which enable geometrical displays to be produced on the screens of cathode-ray tubes. These prior art devices may, for example, be employed to generate a signal which, when applied to the signal input of a television receiver, will produce a pictorial representation of an object such as a workpiece. The prior art display signal generators, however, are extremely complex electronic devices which are incapable of causing the generation of geometrically pure figures on the cathode-ray tube display. Traditionally, the adaptation of these display signal generation devices to existing television systems is difficult and costly.

In the broadcast industry, when it has been desired to transmit a "trick" picture, actual pictures taken by the television cameras have previously been used. Thus, by way of example, it is conventional practice to electronically manipulate the signals produced by several television cameras. It is also known to employ physical devices in accordance with accepted light interference or polarization techniques to provide unusual or artistic effects. However, the use of physical devices or multi-picture combining techniques requires extremely complex equipment and has thus been limited in application to a few highly skilled individuals.

SUMMARY OF THE INVENTION:

The present invention overcomes the above briefly discussed and other disadvantages of the prior art by providing an improved technique and apparatus for producing desired effects on the screen of a television receiver. Apparatus in accordance with the present invention is uncomplicated, easy to use and enables an infinite variety of fixed or animated displays to be created. While the principal object of the invention is to produce decorative and fanciful pattern displays, the invention may also be employed to achieve predetermined geometrical displays.

The present invention is predicated on the use of line or frame coherent periodic signals. As employed herein the term "coherent periodic signal" means a periodic signal which is rephased at each line or frame signal. Thus, the coherent periodic signals of the present invention are at a frequency which is equal to or near the receiver line or frame scanning frequency or a multiple thereof. However, as will be described below, in some instances signals of different frequencies may be employed.

The method of the present invention encompasses the production of at least one complex signal by intersection of a variable reference potential with at least one periodic signal having a frame or line coherence. In order to implement this technique, the invention contemplates apparatus comprising at least one signal generator for producing a line or frame coherent periodic signal and a comparator circuit wherein the magnitude of the coherent periodic signal is compared with a variable reference potential. The comparator circuit generates a complex output signal capable of having two states; these states or levels respectively being commensurate with two colors of the TV display. The output signals of the comparator circuit are applied to the TV receiver via a video adaptation circuit.

BRIEF DESCRIPTION OF THE DRAWING:

The present invention may be better understood and its numerous objects and advantages will become apparent to those skilled in the art by reference to the accompanying drawing wherein.

DESCRIPTION OF THE PREFERRED EMBODIMENTS:

Before describing the invention in detail, it is to be noted that all of the disclosed embodiments are intended to produce signals which will be applied directly to existing television receivers and, in particular, to receivers which operate on the standard 625 line system which is customarily employed in France. It will be understood that it is within the capability of one skilled in the art to adapt the present invention to other types of television receiver systems.

To permit direct use of a standard commercially available television receiver, apparatus in accordance with the invention includes a video adaptation circuit. Such adaptation circuits comprise a synchronization signal generator and a video/synchro mixer which provide, in the manner well known in the art, a composite video signal and line and frame synchronization signals. Synchronization signal generators and video/synchro mixers are well known in the art, typically being employed in television cameras, and thus will not be described in further detail herein.

Figure 1:
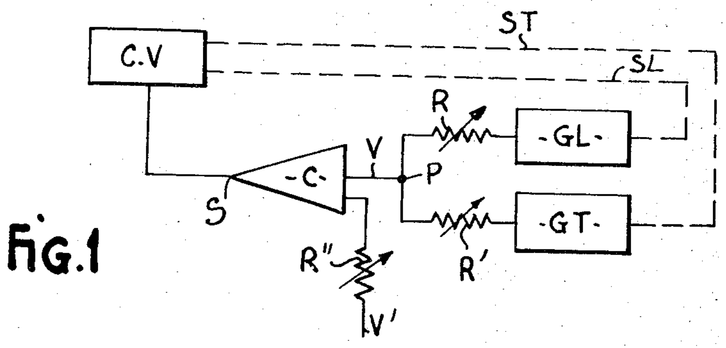
FIG. 1 is a block diagram of a first embodiment of the invention.

With reference now to FIG. 1, a preferred embodiment of the invention comprises a pair of signal generators GL and GT which produce periodic signals. These periodic signals will typically have a sinusoidal waveform. The output signals of generators GL and GT are brought into phase with the line and frame synchronization signals supplied by the adaptation circuit CV. The synchronization is shown diagramatically in FIG. 1 by the application of the SL (line synchronization) signal from the adaptation circuit to generator GL and by the application of the ST (frame synchronization) signal to generator GT. The outputs of signal generators GL and GT are interconnected at summing junction P to produce a complex signal having a maximum potential commensurate with the center of the screen of the receiver. The output potential of the two signal generators may be adjusted by means of respective potentiometers R and R'. The complex signal V appearing at junction P is applied to a first input of a comparator C. The second input to comparator C is derived from a DC source V' and applied to the comparator via a potentiometer r''.

In the most basic form of the invention the output of comparator C has only two levels corresponding to black and white. When the threshold potential V', as set by potentiometer R'', is higher than the maximum value of signal V, the entire screen will be black. When the threshold potential V' is reduced to the maximum level of signal V, the comparator output potential will "shift" and a small white circle will be created at the center of the display. The size of this circle will increase as the threshold potential V' is lowered.

Figure 2:
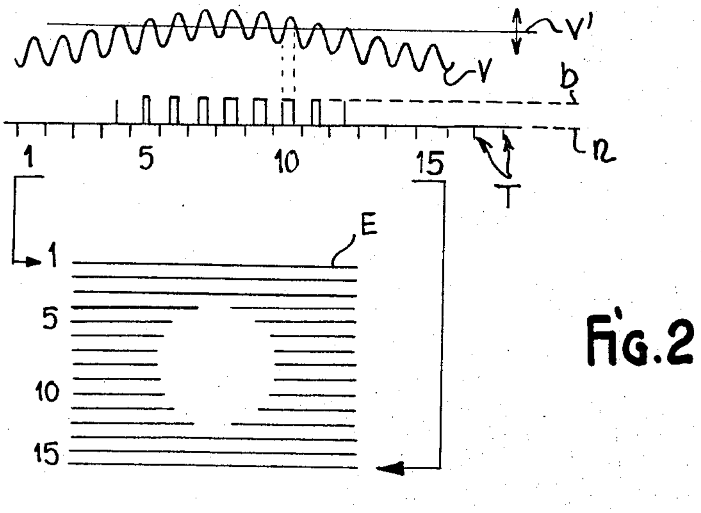
FIG. 2 is a representation of a display which may be obtained through employment of the embodiment of FIG. 1, FIG. 2 also depicting waveforms which appear at various points in the circuit of FIG. 1.

In one reduction to practice of the invention, in order to obtain the above briefly described display, a 50Hz sinusoidal signal phased on the frame synchronization signal and a 15.62 Hz sinusoidal signal phased on the line synchronization signal were employed. The picture obtained with the aid of these signals is represented schematically in FIG. 2 on a screen E. In the interest of clarity, screen E is shown in FIG 2 as being encompassed by only 15 lines of horizontal scan. FIG. 2 also depicts the reference potential V', the development of the complex signal V at summing junction P, the black and white raster levels n and b and the synchronization signal T. It is believed that joint consideration of FIG. 1 and 2 will clearly reveal to those skilled in the art the manner in which the white circle of FIG. 2 is produced at the center of the screen of a television receiver.

Figure 3:
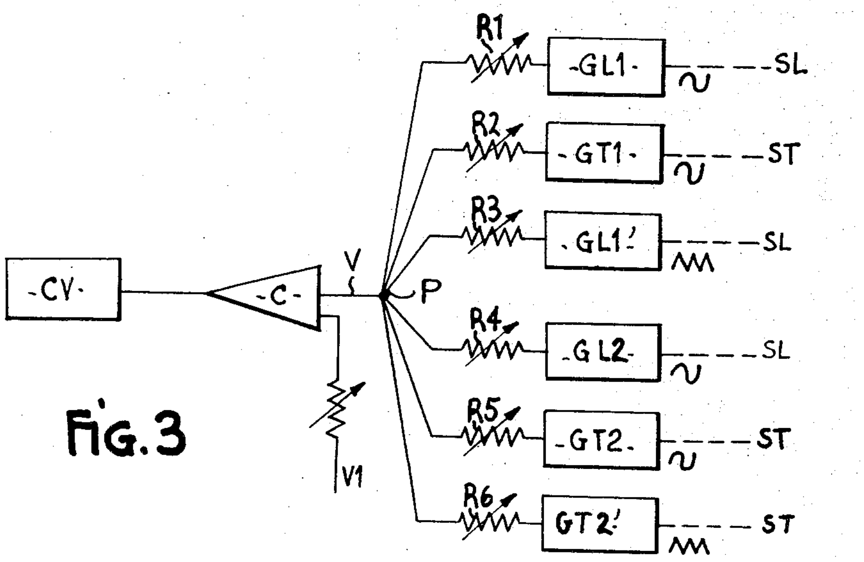
FIG. 3 is a block diagram of a second embodiment of the invention.

Other sinusoidal signals can be added to the complex signal which comprises the V input to comparator C in the interest of varying the display. While these additional signals may be of any frequency, in order to obtain a stable picture the additional signals must be coherent and for this purpose are brought back into phase at each line or frame. Thus, by way of example, in the interest of permitting a large number of possible patterns to be generated, two frame synchronized signals and two line synchronized signals may be employed. Such an embodiment is represented in FIG. 3 and comprises two sinusoidal voltage generators GL1 and GL2 which are brought into phase by line synchronization signals and two sinusoidal voltage generators GT1 and GT2 which are brought into phase by the frame synchronization signals. Preferably these four signal generators include electronic control means which enables the frequencies of the generated sinusoidal signals to be adjusted. In the case of generators GL1 and GL2 the output frequencies can, for example, be varied between 0and 500 Hz while the output frequencies of generators GT1 and GT2 can be varied between 0 and 1,500 Hz. Electronic frequency control suitable for application to the present invention may be achieved through the use of beat-frequency oscillators of the type which will be described below in the discussion of FIG. 6.

The embodiment of FIG. 3 additionally comprises signal generators GL1' and GT2' which produce sawtooth waveforms. Sawtooth generators GL1' and GT2' are respectively synchronized with the line and frame synchronization signals. The FIG. 3 embodiment thus includes means for generating six signals of the same amplitude; i.e., two sinusoidal signals and one sawtooth signal with frame coherence and two sinusoidal and one sawtooth signal with line coherence. These six signals are applied, via respective adjustable resistors R1-R6, to summing junction P to obtain a complex waveform V. As in the case of the FIG. 1 embodiment, the complex signal V is applied to the first input of comparator C. The other input to the comparator is supplied with the variable DC voltage V'. As in the FIG. 1 embodiment, the output signals from comparator C are applied to the television receiver via the video adaptation circuit CV. It will be understood that the signal generators GL1' and GT2' can be comprised of circuitry which produces any coherent exponential signal and thus sawtooth generators have been described by way of illustration only.

Employing the circuitry of FIG. 3, a large variety of simple and complex shapes, stable or moving, can be created on the screen of a television receiver. By variation of the output potential of the sinusoidal signal generators, or by varying the reference potential, variations in the dimensions and outline of the basic black and white display of FIG. 2 may be obtained. Variation in the frequency of the line coherence signals enables an upwards or downwards, fixed or cyclic translational movement of the display. A very slight variation of the frequency of the frame coherent signals enables other cyclic movements of the display to be obtained.

Since the embodiments of FIG. 1 and 2 provide output signals having only two states, respectively commensurate with "0" and "1", only black and white pictures may be obtained therewith.

Figure 4:
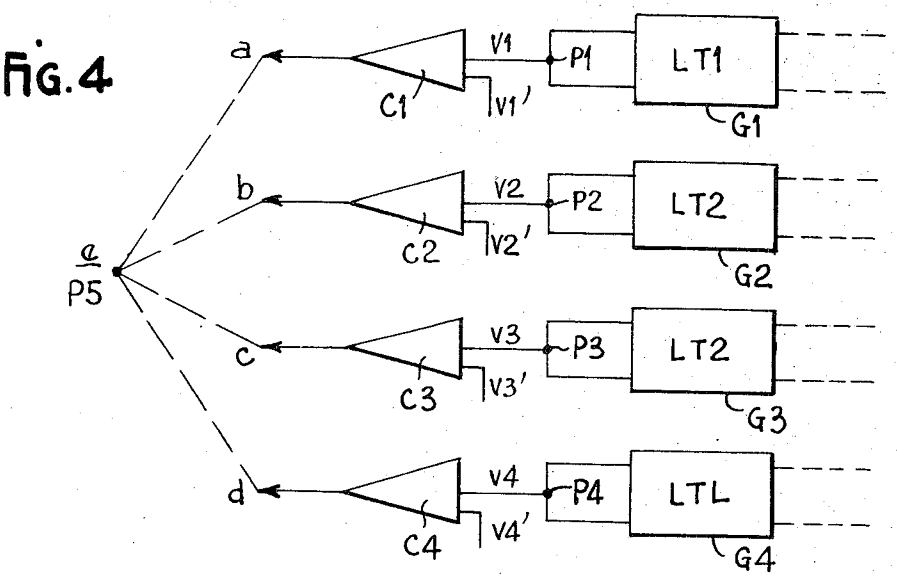
FIG. 4 is a block diagram of a third embodiment of the invention.

In order to produce a display characterized by halftones it is necessary to generate an output signal capable of having more than two states. This may be accomplished by employing several comparators and combining the output signals provided thereby. An example of a "half-tone" system is depicted in FIG. 4. The embodiment of FIG. 4 comprises four generator units G1, G2, G4 and G4; each generator unit comprising at least one signal generator for producing a line coherent signal and one frame coherent signal generator. The output signals of each unit are added at summing junctions P1, P2, P3 and P4 respectively and the complex signals V1, V2, V3 and V4 thus obtained are each applied to one of the inputs to comparators C1–C4. Reference potentials V1', V2', V3' are respectively applied to the other inputs of the four comparators. Each of the comparators provides an output signal; represented on FIG. 4 as *a*, *b*, *c* and *d;* which can have "0" and "1" states. The four comparator output signals are combined, at summing junction P5, to produce a single output signal *e* which may have five different states. To obtain the desired signal *e* the output signals *a*, *b*, *c* and *d* mixed at junction P5 must, of course, have the same characteristics. Application of output signal $e$ to a TV receiver via a video adaption circuit results in a number of half-tones being obtainable on the screen in addition to pure black and white signals. It is to be noted that as few as two or more than four comparators may be employed in the practice of the embodiment of FIG. 4.

Figure 5:
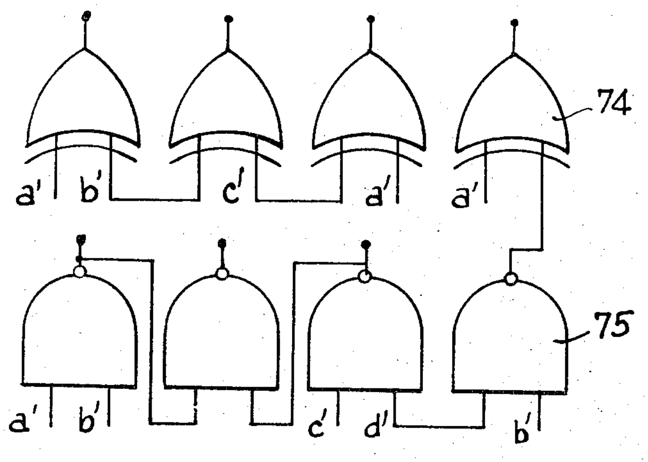
FIG. 5 is a logic circuit diagram relating to the embodiment of FIG. 4.

In addition to obtaining half-tones, special effects may be produced by performing logic operations on the output signals of comparators C1–C4 of the FIG. 4 embodiment. FIG. 5 shows an exemplary logic circuit respectively comprising NAND and AND quadruple circuits 74 and 75; circuits 74 and 75 being commercially available integrated circuits. The output signals of comparators C1–C4 are applied to the corresponding inputs $a'-d'$ of circuits 74 and 75. As will be obvious to those skilled in the art, the logic circuits enables the following functions to be generated: $a+b$, $b+c$, $a+c$, $a+db$, $ab$, $db$, $cd$, and $ab+cd$. The signals obtained at the outputs of the logic circuit can, after resistance matrixing, be applied directly to the input of the video adaptation circuit. Accordingly, employment of the embodiment of FIG. 4 in conjunction with the logic circuit of FIG. 5 permits the generation of twelve video signals of different level. While a complex logic circuit receiving the outputs of more than four comparators can be employed, the use of four comparators enables many special effects to be obtained with a relatively simple logic circuit. It may be noted that the delivery of the output signals of two comparators to an "exclusible OR" circuit enables a chess board effect to be produced on the screen. By employing "not AND" logic, different shapes may be fused while "AND" logic enables the summing of two shapes. A simple inversion, of course, enables a negative picture to be produced.

In order to produce a display on the screen of a color television receiver it is necessary to produce two additional signals for the chrominance. These additional signals may be obtained by applying the output signals of logic circuits 74 and 75 to additional resistive matrices. As previously noted, the combining of the coherent signals delivered to the inputs of comparators C1–C4 is preferably also achieved by resistive matrixing. Such matrixing is shown in FIG. 6.

Figure 6:
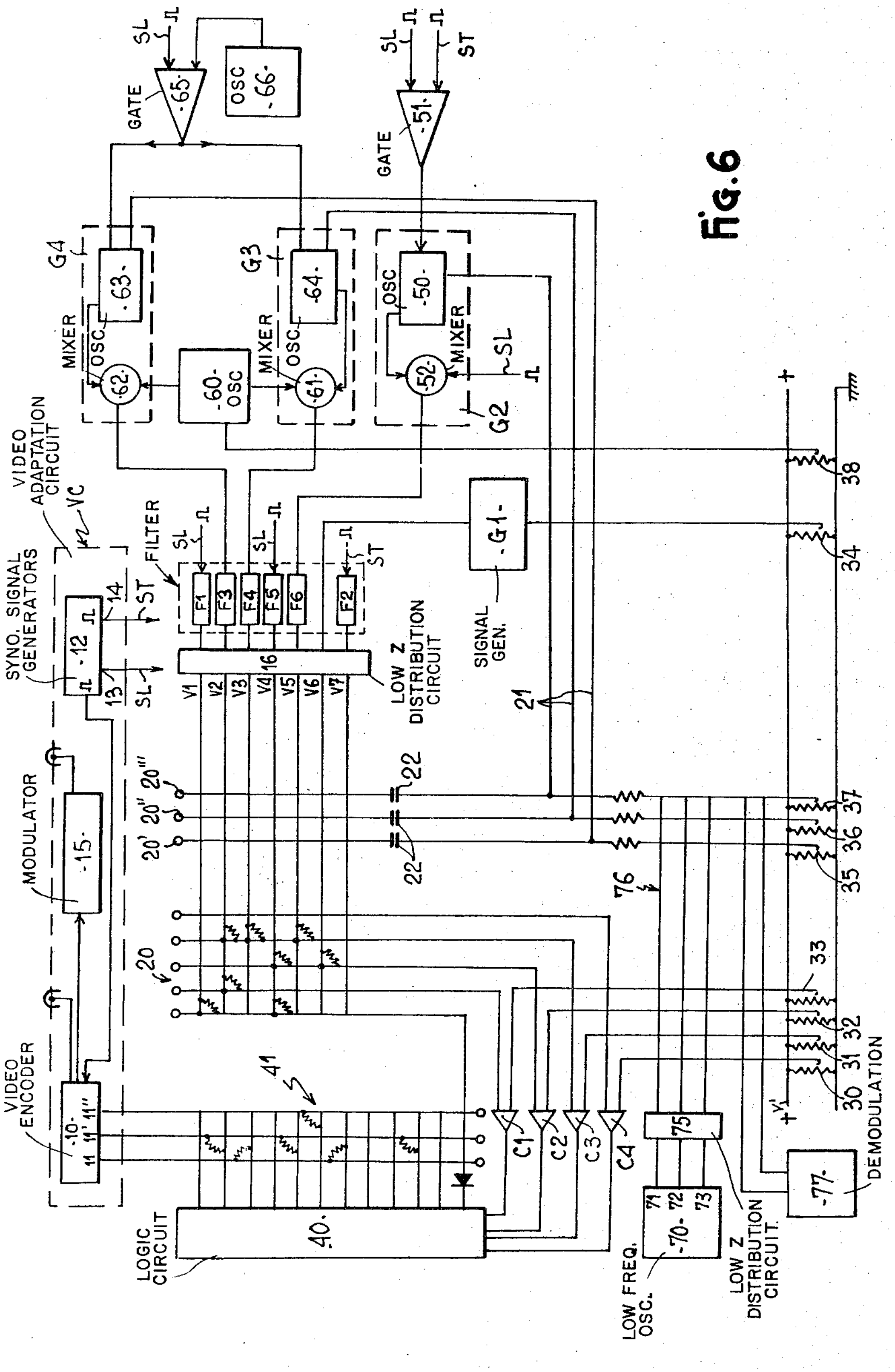
FIG. 6 is a block diagram of a preferred embodiment of the invention, the embodiment of FIG. 6 being especially designed for use with a color television receiver.

Referring now to FIG. 6, a block diagram of a preferred embodiment of the present invention is shown. The embodiment of FIG. 6 generates three signals which enable fixed or moving displays to be produced on the screen of a color television receiver. One of these three signals may be used alone, of course, to produce a black and white display. The FIG. 6 embodiment comprises a video adaptation circuit VC which, for color television, comprises at least one video encoder circuit 10 with three inputs 11, 11′ and 11″ for the three signals corresponding to red, green and blue. The video adaptation circuit also comprises a basic signal generator 12 which provides, at terminals 13 and 14, the line and frame synchronization signals SL and ST respectively. Finally, the adaptation circuit includes HF modulator 15. The video adaptation circuit, while being adapted to the particular color television system used, is in accordance with the prior art. In the FIG. 6 embodiment seven periodic signals V1–V7 with line or frame coherence are produced. These periodic signals are passed through filters F1–F6, as appropriate, and a low impedance distribution circuit 16 prior to being mixed by means of a resistive matrix 20. The complex signals obtained at each intersection of matrix 20 are selectively applied to first inputs of four comparators C1–C4. The second input terminal of each comparator is connected, through respective potentiometers 30, 31, 32 and 33, to a source of a reference potential V′. The output signals provided by comparators C1–C4 are delivered to the inputs of logic circuit 40 which may be similar to the circuit shown in FIG. 5. The outputs of logic circuit 40 are combined in a resistive matrix 41 and the thus generated signals are applied to the inputs 11, 11′ and 11″ of the encoder 10 of the adaptation circuit.

Continuing with the discussion of FIG. 6, the seven periodic signals employed in the circuit are produced by four signal generators G1, G2, G3 and G4 and the basic signal generator 12 of the video adaptation circuit. Signal V1 consists of a sawtooth waveform obtained by applying the line synchronization signal SL through an RC filter F1 which converts the square wave produced by signal generator 12 into the desired sawtooth wave. Signal V7 is obtained in the same manner by passing the frame synchronization signal SL from generator 12 through filter F2. Signal V4 is a sinusoidal signal obtained by passing the SL signal through filter F5. Signals V2, V3 and V5 are produced by signal generators G4, G3 and G2 respectively. Signal generator G1 is an oscillator which produces a variable frequency output; the output of G1 being at a frequency slightly higher or lower than the frame frequency $tt$ or a multiple thereof; i.e., $tt \pm 2$ Hz. The output frequency of generator-oscillator G1 can be adjusted through the use of potentiometer 34. Signal generator G1 is a free running oscillator and the output signal provided thereby is applied directly through the distribution circuit 16 to matrix 20.

The signal generator G2 produces a variable frequency sinusoidal waveform of, for example, between 0–1000 Hz. The output of G2 is applied to the distribution circuit through filter F6. Signal generators G3 and G4 supply sinusoidal waveforms of variable frequency, between 0 and 200 kHz, which are applied to distribution circuit 16 via band pass filters F3 and F4 respectively. The output frequencies of signal generators G2, G3 and G4 are adjustable by means of respective potentiometers 37, 36 and 35. In the interest of obtaining coherent pictures via slight modulation in the output frequency of generators G2–G4, these signal generators consist of beat-frequency oscillators of a type well known in the art which are brought back into phase at each line or frame synchronization signal.

Signal generator G2 comprises an oscillator 50 which operates at the line scanning frequency. Oscillator 50 can be modulated ± 1000 Hz with respect to the line frequency and is phased therewith by the output of a gate circuit 51. The inputs to gate circuit 51 are the line and frame synchronization signals SL and ST. Through operation of the gate circuit each frame signal blocks the oscillator thereby causing the oscillator to start in phase with the line signal. The output of oscillator 50 is applied to a first input of a mixer circuit 52. The line synchronization signal SL is delivered to the other input of mixer circuit 52 whereby the mixer provides an output signal which can be modulated in frequency from 0–1000 Hz. This signal is delivered to distribution circuit 16 and matrix 20 via the band pass filter F6.

Signal generators G3 and G4, which produce signals phased with the line synchronization signal, each receive the output of a free running quartz crystal controlled oscillator 60 which operates at the line frequency, a multiple of the line frequency or, preferably, at 7 mHz. The output of oscillator 60 may be frequency modulated by ± 200 Hz in a manner known in the art through the use of potentiometer 38. In respective signal generators G3 and G4 the output signal of oscillator 60 is applied to first inputs of mixer circuits 61 and 62. The second input of mixer 61 of signal generator G3 is supplied from an oscillator 64. Similarly, the second input of mixer 62 of signal generator G4 is supplied by the output of an oscillator 63. Oscillators 63 and 64 operate at the same frequency as oscillator 60 and can, as noted above, be frequency modulated with the aid of potentiometers 36 and 37 respectively. Oscillators 63 and 64 are adjusted in phase on the line syncronization signal with the aid of a gate circuit 65. The line synchronization signal is applied to a first input of gate 65 while the second input of the gate circuit is supplied from a master oscillator 66. The oscillators 63 and 64 are thus blocked at each line signal SL and therefor start with a constant phase. The beating of the output signals of oscillators 63 and 64 with the signal of free running oscillator 60 provides, at the outputs of mixers 61 and 62, signals adjusted in phase on the line synchronization.

The circuitry of FIG. 6 enables a special phenomena to be obtained. A very slight adjustment of the output frequency of oscillator 60 causes a translational vertical movement of the display; the direction of movement being dependent on the direction of adjustment and the sign of the difference between the frequency of oscillator 60 and that of the blocked oscillators 63 and 64. Thus, upward translational movement can be obtained for one signal while simultaneously a downward translational movement can be obtained for the other.

Referring again to FIG. 6, the matrix 20 comprises supplemental matrices 20′, 20″ and 20‴ which enable the coherent signals to be appled, via capacitors 22 and conductors 21, to the modulation inputs of oscillators 50, 63 and 64. This arrangement enables additional effects and cyclic variations to be obtained.

The apparatus of FIG. 6 further comprises a very low frequency oscillator 70 having output terminals 71, 72 and 73. Oscillator 70 may, for example, provide output signals at 1 Hz, 0.1 Hz and 0.01 Hz respectively at output terminals 71, 72 and 73. These low frequency signals are applied, through a low impedance distribution circuit 75, to a matrix 76. In matrix 76 the low frequency signals are mixed with the reference potentials for comparators C1–C4 or the steady state frequency modulation potentials of oscillators 50, 63 and 64. Thus, through the use of low frequency oscillator 70, very gradual variations of the reference potentials and thus of the magnitude of the output signals of the oscillators can be obtained in the interest of producing gradual movements of the displays produced on the screen of the receiver. Demodulated musical signals can also be applied to matrix 76; for example by a demodulation circuit 77.

Figure 7A:
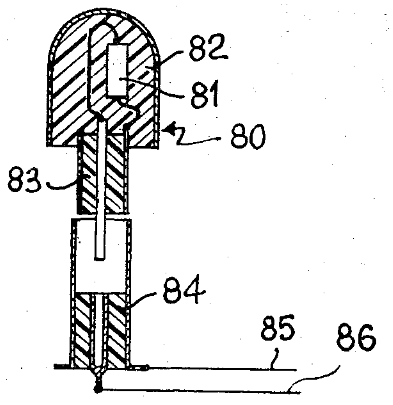
FIG. 7 is a representation of a control panel which may be employed with the embodiment of FIGS. 4 and 5; and FIG. *7a* is a cross-sectional side elevation view of a connector particularly well suited for use with the invention.

In the FIG. 6 embodiment the matrices 20, 41 and 76 are resistive matrices. In accordance with a particularly advantageous embodiment of the invention the connections within the matrices are obtained with the aid of connectors of the type shown in FIG. *7a.* In FIG. 7a a connector 80 is shown which comprises a resistor 81 embedded in a plastic body 82. The terminals of resistor 81 are connected to the terminals of a male coaxial plug 83 fitted into the lower end of plastic body 82. Coaxial plug 83 will be received in a socket 84 having terminals connected to the the lines and columns, respectively indicated at 85 and 86, of the matrices. It is to be noted that the resistors 81 may be replaced by capacitors of suitable value in the interest of obtaining bloom, clear and stereoscopic effects to the level of the matrixing of the logic signals provided by matrix 41. While the use of resistance elements of different values in the connectors enables a signal to be restored to several levels, replacing the resistance elements with different capacitors enables only the transition of one signal to be transmitted. Passage from the " 0" state to the "1" state produces a white line and return to the "0" state a black line. These lines, clear to the left and shaded off to the right, may be employed to give the illusion of a stereoscope for a particular shape. With other signals, however, the capacitors will produce a different effect. Thus, in TTL logic, the "0" state is defined at the output by a saturated transistor. The capacitance would therefor be grounded and the transition time of the other signals thus impaired producing a "bloom" effect. For the "1" state, on the other hand, the capacitance is effectively open and the potential can therefor not fall below a predetermined level but can rise. Accordingly, there is no longer any impairment of the other signals and the display again becomes clear. A clear display can therefor be made to appear on the outside of a shape produced with a blurred display on the inside thereby providing an illusion of a moving stereoscopic shape. By way of example, the impression of a blurred drop of water running across a chess board while the chess board itself undergoes gradual distortion can be produced.

Figure 7:
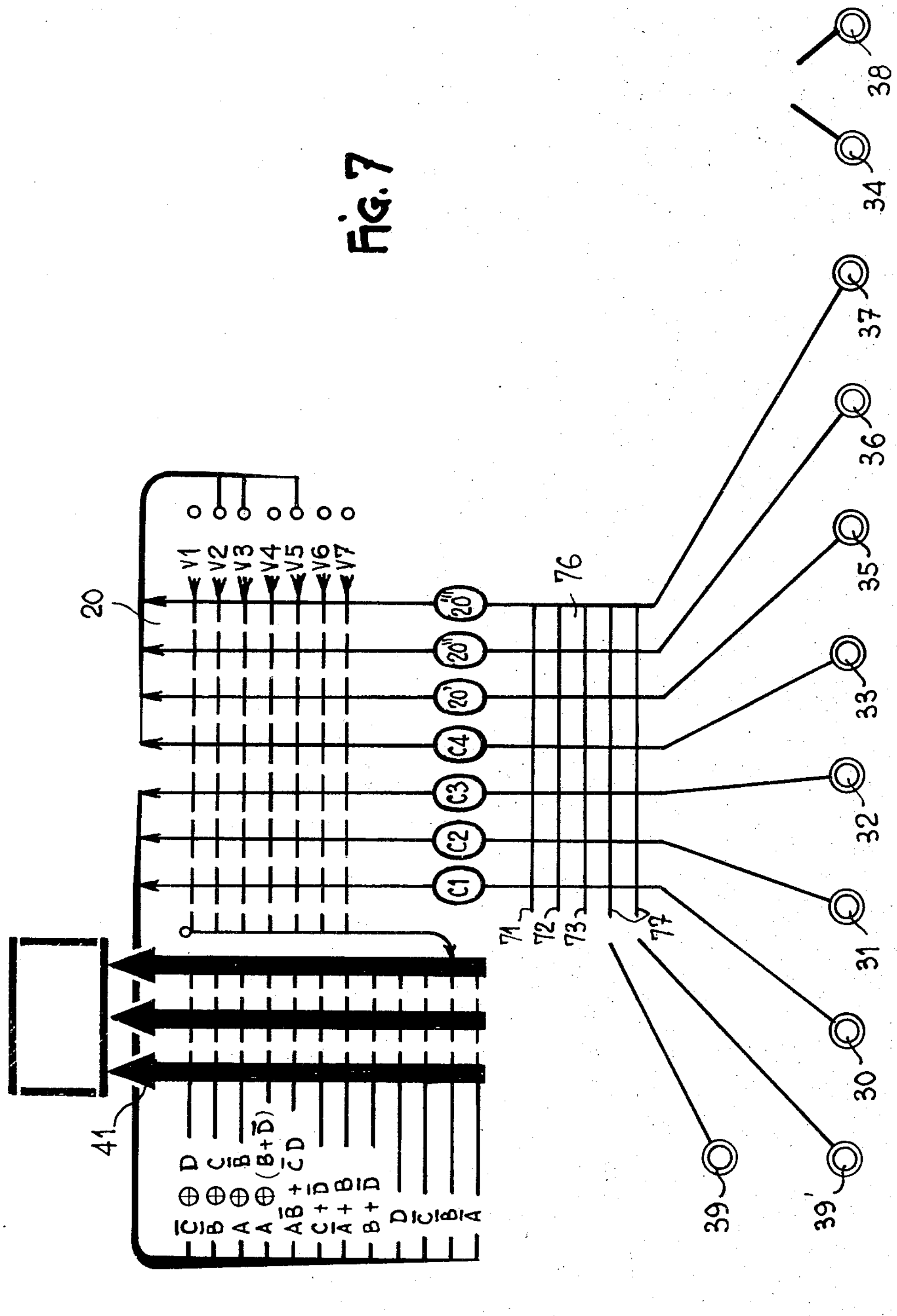

FIG. 7 is a representation of a control panel which may be employed with the circuitry of FIG. 6 including the connectors of FIG. *7a.* FIG. 7 indicates the shaping matrix 20 for mixing the periodic signals V1–V7 as well as the matrices 41 for mixing the logic signals and 76 for mixing the reference potentials of the comparators with the low frequency signals from oscillator 70 or the demodulated signals from circuit 77. FIG. 7 also depicts the control knobs for potentiometers 30–38. Two additional potentiometers 39–39′, which enable the levels of the demodulated musical signals applied to matrix 76 to be controlled, are also represented in FIG. 7. The arrangement of the various elements as represented by FIG. 7 facilitates the creation of the different effects and displays which can be produced by the present invention on the screen of either a black and white or color television receiver. In FIG. 7 the output signals of comparator C1–C4 of the FIG. 6 embodiment are indicated by reference characters A, B, C and D. Also, to the left of the matrix 4l, the logic signals obtained at the outputs of logic circuit 40 have been indicated.

While preferred embodiments have been shown and described, various modifications and substitutions may be made thereto without departing from the spirit and scope of the invention. Accordingly, it is to be understood that this invention has been described by way of illustration and not limitation.

What is claimed is:

1. In an apparatus for producing a fixed or antimated display on the cathode ray tube of a television receiver, said receiver constituting a portion of a display system including a receiver and a video adaptation circuit for converting applied signals to proper form for application to the receiver input terminals, the improvement comprising:

first oscillator means providing a first plurality of periodic signals;

first synchronizing means responsive to the receiver line scanning control signals, said first synchronizing means being coupled to said first oscillator means to produce line coherence of said first plurality of periodic signals;

means providing a second plurality of periodic signals with line coherence;

means providing a further periodic signal with receiver frame coherence;

first matrix means having a plurality of input and output terminals, said periodic signals of said first and second plurality and said further periodic signal being applied to said first matrix means, said matrix means mixing said periodic signals to provide a plurality of output signals;

a plurality of comparator means, said first matrix means output signals being applied as first inputs to individual of said comparator means;

means providing a variable steady state reference voltage as a second input to each of said comparator means;

means connected to the outputs of said comparator means for mixing the complex output signals provided thereby in response to comparison of the resistive matrix output signals and said variable reference voltages, said mixing means having a plurality of output terminals; and means applying signals presented at said mixing means output terminals to the adaptation circuit.

2. The apparatus of claim 1 wherein said means for mixing said comparator means complex output signals includes:

logic circuit means for combining said comparator means output signals in a predetermined manner.

3. The apparatus of claim 2 wherein said means for mixing said comparator means complex output signals further includes:

second resistive matrix means, the signals generated by said logic circuit means being applied to said second resistive matrix means, said second resistive matrix means having a plurality of output terminals.

4. The apparatus of claim 1 further comprising:

means for frequency modulating the output signals provided by said first oscillator means.

5. The apparatus of claim 3 further comprising:

means for frequency modulating the output signals provided by said first oscillator means.

6. The apparatus of claim 1 further comprising:

means providing a periodic signal at a low frequency, said low frequency being less than the frequencies of any of said first or second plurality of periodic signals;

third resistive matrix means;

means applying said comparator means reference voltages and said low frequency signal to said third resistive matrix means to produce a mixing thereof; and means applying output signals derived from said third resistive matrix means to said comparator means for comparison with the output signals from said first matrix means.

7. The apparatus of claim 1 further comprising:

free running oscillator means, said free running oscillator means output signal being displaced in frequency from the receiver line scanning frequency by a small amount; and means for mixing at least one of said line coherent periodic signals with said free running oscillator signal prior to the application thereof to said first matrix means.

8. The apparatus of claim 1 wherein said first matrix means comprises:

a plurality of plug-board terminal means, each of said terminal means defining in part a pair of intersecting conductors of the matrix; and plug means for insertion in said terminal means, said plug means including passive circuit elements of predetermined value whereby the mixture of the signals applied to the matrix and the potential of the mixing signals may be preselected.

9. The apparatus of claim 8 wherein at least one of said plug means includes a capacitive element.

10. The apparatus of claim 8 wherein at least a plurality of said plug means include resistive elements.

11. The apparatus of claim 5 wherein said first matrix means comprises:

a plurality of plug-board terminal means, each of said terminal means defining in part a pair of intersecting conductors of the matrix; and plug means for insertion in said terminal means, said plug means including passive circuit elements of predetermined value whereby the mixture of the signals applied to the matrix and the potential of the mixing signals may be preselected.

12. The apparatus of claim 11 wherein at least a plurality of said plug means include resistive elements.

13. The apparatus of claim 12 further comprising:

free running oscillator means, said free running oscillator means output signal being displaced in frequency from the receiver line scanning frequency by a small amount; and means for mixing at least one of said line coherent periodic signals with said free running oscillator signal prior to the application thereof to said first matrix means.

* * * * *